United States Patent [19]

Davidson

[11] 4,017,588

[45] Apr. 12, 1977

[54] MANUFACTURE OF SOLID AMMONIUM PHOSPHATE

[75] Inventor: Eric Davidson, Edinburgh, Scotland

[73] Assignee: Scottish Agricultural Industries Limited, Edinburgh, Scotland

[22] Filed: Sept. 2, 1975

[21] Appl. No.: 609,808

[30] Foreign Application Priority Data

Sept. 13, 1974 United Kingdom ............ 40002/74

[52] U.S. Cl. .............................. 423/313; 423/310; 71/43

[51] Int. Cl.² ................. C01B 15/16; C01B 25/28

[58] Field of Search .......... 423/309, 310, 312, 313; 71/43

[56] References Cited

UNITED STATES PATENTS 3,226,184  12/1965  Brownlie et al. ................. 423/310
3,313,614  4/1967   Sharples et al. ..................... 71/43

Primary Examiner—Earl C. Thomas
Assistant Examiner—Gregory A. Heller
Attorney, Agent, or Firm—Cushman, Darby & Cushman

[57]  ABSTRACT

The invention relates to a process for the manufacture of solid monammonium phosphate with good granulation properties suitable for use in compound fertiliser manufacture. An improvement in product quality is obtained when between 20% and 80% of an aqueous slurry of ammonium phosphate, formed by the ammoniation of wet-process phosphoric acid, is mixed with a second acid prior to entry into a moisture disengagement unit. This treatment precipitates some monammonium phosphate crystals which provide nuclei for further crystal growth. After a short time delay to allow crystals to form, the remainder of the slurry is then added separately to the moisture disengagement unit.

9 Claims, 1 Drawing Figure

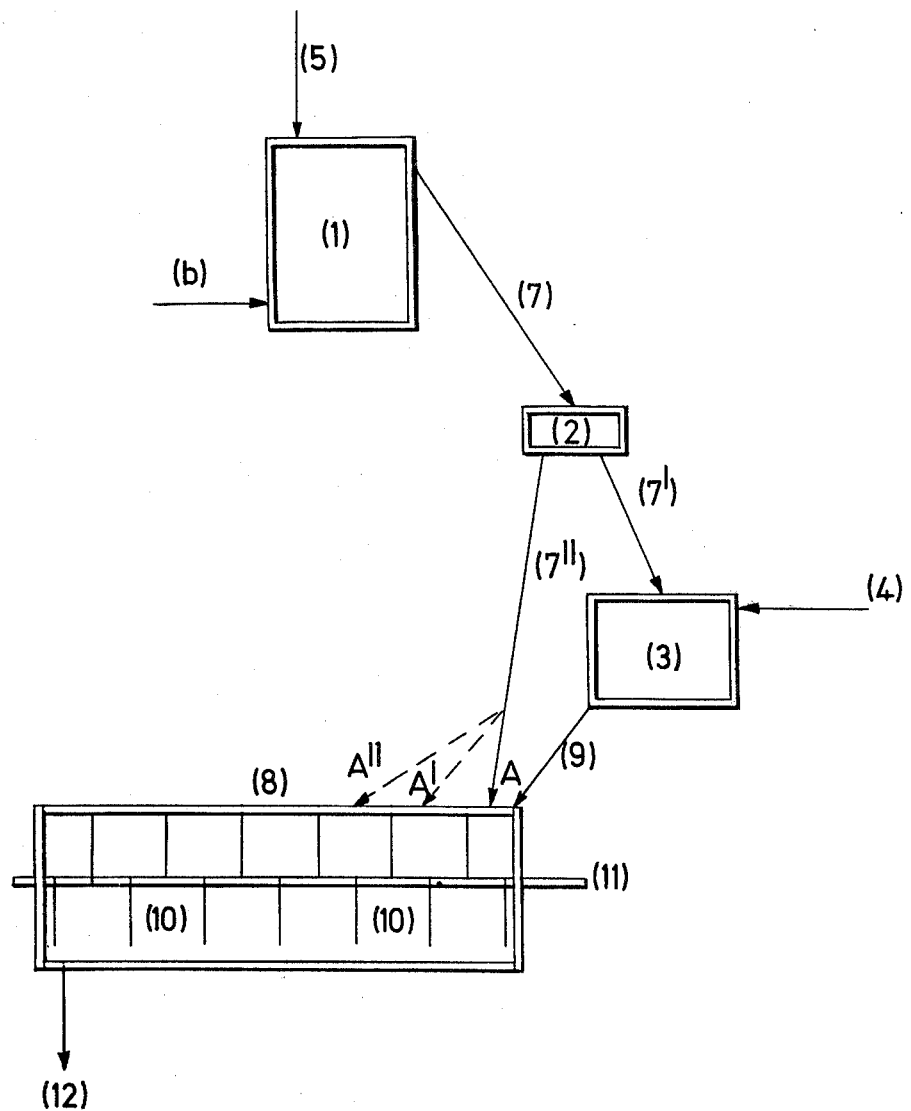

MANUFACTURE OF SOLID AMMONIUM PHOSPHATE

The present invention relates to a process for the production of solid ammonium phosphate, particularly monammonium phosphate.

Ammonium phosphates such as monammonium phosphate, $NH_4H_2PO_4$, (hereinafter referred to as MAP) and diammonium phosphate, $(NH_4)_2HPO_4$, (hereinafter referred to as DAP), and mixtures of these salts, are desirable ingredients of fertilisers because they supply both nitrogen and phosphorus, two elements which are essential to plant growth. It is well known that fertiliser grade ammonium phosphate may be made by a process which comprises treating wet-process phosphoric acid with ammonia. An ammonium phosphate is characterised by the atomic ratio of nitrogen to phosphorus which it contains, commonly termed the N:P atomic ratio; thus monammonium phosphate has an N:P atomic ratio of 1.0 and an equimolar mixture of monammonium phosphate and diammonium phosphate has an N:P atomic ratio of 1.5. In a composition containing other nitrogen or phosphorus compounds in addition to ammonium phosphate the N:P atomic ratio refers only to the ratio in the ammonium phosphate.

The impurities present in wet-process phosphoric acid are important in the production of solid fertiliser grade ammonium phosphate, particularly MAP, with good granulation properties. In the solid product comprising ammonium phosphate produced by the process of our British Pat. No. 951,476, the impurities are present largely as amorphous gels and for optimum granulation properties most of the impurities should be in this form.

Important impurities include iron, aluminium, magnesium and fluorine. The effects of these elements are interrelated, and a small change in the proportion and amount of only one of them can have a marked effect on the production and the physical properties of the product. For example, when MAP/DAP slurry is acidulated as described in British Pat. No. 951,476, it is possible to alter the size and shape of the crystals of MAP precipitated It has been found, for example, that crystals of average 100 μm predominate in a solid powder form of MAP eminently suitable for the granulation of mixed NPK fertiliser products.

The product of the process of our British Pat. No. 951,476 has been proved to have good granulation properties, but certain wet-process acids containing the above-mentioned impurities in undesirable amounts and/or ratios, for example wet-process acids made from certain grades of Khouribga and Gafsa phosphate rock, that is, phosphate rocks from North Africa, can give rise to difficulties by causing aggregation of small crystals so that extra milling of the product may be required to give a solid product within the desired size range (generally this is at least 90% passing a 3½ mm standard wire mesh screen). It would increase the expense of the process of British Pat. No. 951,476 to grind finely, screen and backfeed product to the process. We have now discovered, as described hereinafter, how to produce an ammonium phosphate product characterised by an abundance of crystals of MAP in the size range 30 – 200 μm (average 100 μm) and a reduction in aggregates of crystals to give a powdery fluffy appearance to the solid. The resulting ammonium phosphate product has good granulation properties suitable for use in NPK compound fertiliser manufacture. By good granulation we mean that the efficiency of granulation is such that a high yield, for example, greater than 60% in the desired NPK product size range, is obtained, for example, in the product size range 1½ to 3½ mm.

We have now discovered that an improvement in MAP crystal growth is obtained if part of the MAP/DAP slurry flow, formed by the ammoniation of wet-process phosphoric acid, is mixed with a secondary acid feed, as hereinafter defined, prior to entry into a moisture disengagement unit, for example, a pin shafted U-trough mixer. The mixing of part of the MAP/DAP slurry and a secondary acid feed results in the more controlled precipitation of some MAP and thus the formation of nuclei for crystal growth in the moisture disengagement unit. The improvement is obtained by mixing between 20% and 80% by volume of the primary MAP/DAP slurry with the secondary acid feed to precipitate some MAP. After a short time delay to allow crystals to form, the remainder of the MAP/DAP slurry is added separately at one or more points to the moisture disengagement unit.

A process for the production of a particulate solid product comprising ammonium phosphate of N:P atomic ratio 0.95 to 1.05 is already known wherein a primary phosphoric acid-containing feed and ammonia are added to an aqueous slurry of ammonium phosphate of flowable consistency at the temperature of working and having an N:P atomic ratio of between 1.3 and 1.5 to form more slurry of substantially the same composition and concentration and flowable consistency, removing an amount of said slurry substantially equivalent to that produced by the addition of the phosphoric acid and ammonia and thereafter mixing the removed slurry with a secondary acid feed (e.g. wet-process phosphoric acid) to reduce the N:P atomic ratio to 0.95 to 1.05. Hereinafter the above-described process is referred to as "a process of the kind described". In accordance with the present invention we provide a process of the kind described wherein between 20% and 80% by volume of the removed slurry is mixed with the secondary acid feed, followed by the addition to the mixture of the remainder of the slurry, so that the ammonium phosphate of the resulting product has an N:P atomic ratio in the range 0.95 to 1.05, the water contents of the removed aqueous slurry and the secondary acid feed being such that the resulting product starts to solidify in a moisture disengagement unit where it is treated for a sufficient period of time for said product to be solid at ambient temperature.

Below an N:P atomic ratio of 0.95 ammonium phosphate becomes decidedly acid, corrosive and hygroscopic, owing to the presence of free phosphoric acid, and since the invention is concerned primarily with the production of MAP, the upper limit of the N:P atomic ratio is fixed at 1.05. The production of an aqueous slurry of ammonium phosphate of N:P atomic ratio greater than about 1.6 usually results in loss of ammonia, and for an aqueous slurry of ammonium phosphate of N:P atomic ratio below about 1.2 the temperature rise and other effects of admixture with a secondary acid feed are generally insufficient to promote the evaporation and crystallisation necessary for the production of the desired solid product at ambient temperatures. It is to be remembered that ammonium phosphate has its maximum solubility in an MAP/DAP slurry at an N:P atomic ratio of about 1.4 and this ratio is associated with a pH of about 6.5.

If it is desired to incorporate at least one another ammonium salt, such as, for example, ammonium nitrate, ammonium sulphate and/or urea, into the particulate solid ammonium phosphate, then these may be added during the process; for example, ammonia may be added to a mixed acid comprising phosphoric acid and sulphuric acid to form an aqueous slurry of ammonium phosphate and ammonium sulphate of flowable consistency at the temperature of working.

By the term "solid" is meant an intimate mixture of solid particles and saturated aqueous solution of soluble ingredients, wherein the proportion of solution is less than that at which more than a trace of liquid may separate from the product under a pressure of 6 p.s.i.g. which approximates to usual storage conditions. The maximum levels of moisture content vary with crystal size and impurity content of the ammonium phosphate, being lower with larger crystals. The maximum levels of moisture content are also lower when at least one other ammonium salt, as hereinbefore defined, is incorporated into the solid ammonium phosphate. For example, an MAP of N:P atomic ratio 0.95 made from 72% B.P.L. grade Khouribga phosphate rock and of crystal size mainly within the range 30 – 200 $\mu$m, would have a maximum moisture content of 16% under a pressure of 6 p.s.i.g. and remain within the aforesaid definition of solid.

It is to be understood that the moisture introduced into the process of the invention is not to be so high as to prevent the end-product being solid at ambient temperature.

Preferably the ammonia added is either in the gaseous or substantially anhydrous liquid form but ammonia solutions are also suitable so long as the water introduced thereby does not cause the product moisture content to exceed the limiting value above which the product ceases to be a solid at ambient temperature.

As hereinbefore described, the MAP/DAP slurry is formed by the ammoniation of wet-process phosphoric acid, which is the "primary acid" feed. The aforementioned "secondary acid" feed is the acid which is used to lower the N:P atomic ratio of the slurry. The "secondary acid" feed comprises a mineral acid, for example, phosphoric acid, (in particular wet-process phosphoric acid), nitric acid or sulphuric acid, either alone or mixed with one another. This acid(s) may itself be partially ammoniated. The use of such partially-ammoniated acid(s) is particularly suitable in the process of the present invention for the production of products which are solid at ambient temperature and which have an N:$P_2O_5$ weight ratio of, for example, 1:2, 1:1 or 2:1.

Products of N:$P_2O_5$ weight ratio of, for example, 1:2, 1:1, 2:1, may also be produced by introducing an ammonium salt either as a solid or as a concentrated aqueous solution during, or following, the addition of the secondary acid feed. Additionally or alternatively, nitrogen compounds, as for example urea, may be introduced as a solid or as a concentrated aqueous solution during, or following, the addition of the secondary acid feed. A proportion of the solid end-product of the process of the present invention may be introduced, that is recycled, before, during or after the mixing of the secondary acid with MAP/DAP slurry in order to assist in the rapid evolution of moisture by altering the consistency of the mixture of acid and slurry to allow greater exposure of surface of the mixture in the apparatus used for moisture disengagement.

Further, other solid materials such as muriate of potash may be added at, or following, the point of addition of the secondary acid to give a solid product containing nitrogen, phosphorus and potassium.

In accordance with one embodiment of the invention, a solid ammonium phosphate of N:P atomic ratio in the range 0.95 to 1.05 is produced by mixing "wet-process" phosphoric acid of $P_2O_5$ content in the range 30% to 54% $P_2O_5$ and gaseous ammonia to form an aqueous slurry of ammonium phosphate, the N:P atomic ratio of the slurry being fixed in the range 1.3 to 1.5 and the moisture content of the slurry being fixed in the range 10% to 20%, in such proportions as to form more slurry of substantially the same composition, i.e. substantially fixed N:P atomic ratio and substantially fixed moisture content, simultaneously removing from the slurry an amount substantially equivalent to that produced from the phosphoric acid and ammonia, and mixing 20% to 80% by volume, preferably 25% to 75% by volume, of the removed amount of slurry with further wet-process phosphoric acid, followed by the addition of the remainder of the slurry such that the product so formed solidifies mainly by evaporative cooling in a moisture disengagement unit and is of the desired N:P atomic ratio and under such conditions that the moisture content of the product is so reduced by evaporation caused, for example, by the heat of reaction and heat of crystallisation and the use of sensible heat, that the product is solid as hereinbefore defined at ambient temperature.

The process of the invention is illustrated in the accompanying drawing.

In the drawing, a slurry splitter box 2 is a device for dividing the MAP/DAP slurry stream 7 from a reaction vessel 1 and may, for example, comprise a vessel containing two or more separate sections (not shown) comprising, for example, compartments, channels, weirs, etc., each with an outlet which may be opened or closed in order that the slurry stream may be divided in the desired proportion. A mixing unit 3 for mixing the MAP/DAP slurry 7' with the secondary acid feed 4 may, for example, comprise a tank or a number of tanks in series each with means (not shown) for vigorous agitation of the slurry and the secondary acid feed. Vigorous agitation in the mixing unit may be effected by stirring with, for example, a propellor.

The following examples describe the process of mixing the secondary acid feed with part of the slurry stream, so that nuclei of MAP are produced to provide growth points for subsequent crystallisation and thus encourage further crystal growth.

EXAMPLE 1

A solid product, solid as hereinbefore defined, of ammonium phosphate of average composition 10.9% N, 48.0% $P_2O_5$, 7.6% $H_2O$ and N:P atomic ratio 1.00 is made at a rate of 516 kg per hour by the addition of 442 kg/hour of 40% $P_2O_5$ wet-process phosphoric acid 5 at 20° C (made from Khouribga phosphate rock) and 66 kg/hour of gaseous ammonia 6 to a reaction vessel 1 containing a slurry of composition 44% $P_2O_5$, 14% $H_2O$ and N:P atomic ratio 1.4 at a temperature in the range 120° – 125° C (but not above 130° C). The hot slurry, substantially equivalent to that produced in the reaction vessel, is introduced via 7 into a slurry splitter box 2, that is, a feed box for splitting the slurry feed. One third by volume of the MAP/DAP slurry $7^1$ is premixed with 147 kg/hour of 48.0% $P_2O_5$ wet-process phosphoric acid (the secondary acid feed) 4 in a steam-heated slurry/acid mixing unit 3 mounted near one end of a pin mixer 8. The treated slurry then flows via 9 to a pin mixer 8. The remaining two-thirds by volume of MAP/DAP slurry is added direct via $7^{11}$ to the pin mixer at one or more points A, $A^1$, $A^{11}$, for example at point A as shown in the drawing. The overall effect of this procedure is the precipitation of some MAP crystals in 3 and thus the formation of nuclei for crystal growth in the pin mixer 8 when the remainder of the slurry is added via $7^{11}$. The product of this reaction solidifies as it passes along the mixer 8 and is repeatedly broken up and has fresh surfaces exposed by the action of blades 10 on a rotating shaft 11 which thus assists disengagement of moisture which is carried off by overhead venting (not shown) and gives the aforementioned final solid product at 12, the product being at 33° C and containing 7.6% $H_2O$. All parts are parts by weight except for the divided slurry feed which are by volume.

The resulting MAP was examined and compared with a control sample prepared in the same way but omitting the step of mixing the "secondary acid" feed with part of the slurry stream. The process of the present invention has the effect of giving a more fluid slurry at N:P atomic ratio 1, and a greater proportion of large crystals. In addition, the product obtained by the process described in this Example was a mixture of finely divided fluffy material and very soft granules, while the control sample was a hard, gritty product.

EXAMPLE 2

A solid product, solid as hereinbefore defined, of ammonium phosphate of average composition 11.8% N, 46.6% $P_2O_5$, 5.5% $H_2O$ and N:P atomic ratio 0.98 was made at a rate of 11.4 tonnes/hour by the addition of 9.77 tonnes/hour 39% $P_2O_5$ wet-process phosphoric acid 5, made from Khouribga phosphate rock, and 1.63 tonnes/hour of gaseous ammonia 6 to a reaction vessel 1 containing a preformed slurry of N:P atomic ratio 1.4 and at a temperature of 125° C. The hot slurry, substantialy equivalent to that produced in the reaction vessel, was introduced via 7 into a slurry splitter box 2 where initially 25% by volume of the MAP/DAP slurry was premixed with 3.16 tonnes/hour 48% $P_2O_5$ wet-process phosphoric acid (the secondary acid feed) 4 in a slurry/acid mixing unit 3 near one end of a pin mixer 8. The treated slurry then flowed via 9 to the pin mixer 8. The remaining 75% by volume of MAP/DAP slurry was added direct via $7^{11}$ to the pin mixer at point A as shown in the drawing. During the course of the production run an increasing proportion of slurry, in increments of approximately 15% up to 75% was diverted via $7^1$ for treatment with the secondary acid feed 4 in the mixing unit 3. Thus, a series of separate split slurry feeds were examined between the ranges of 25% to 75% by volume. The remaining MAP/DAP slurry volumes were added direct via $7^{11}$ to the pin mixer 8 as hereinbefore described.

In each case the resulting MAP was examined and compared with a control sample prepared in the same way but omitting the step of mixing all the secondary acid feed with part of the slurry stream. The process of the present invention had the effect of giving a more fluid slurry at N:P atomic ratio 1 and a greater proportion of large crystals. In addition, the product obtained by the process described in this Example was a mixture of finely-divided fluffy material and very soft granules, while the control sample was a hard, gritty product.

EXAMPLE 3

313 kg/hour of a wet-process phosphoric acid 5 containing 40% $P_2O_5$ made from Gafsa phosphate rock was treated with 36 kg/hour gaseous ammonia 6 in a separate reaction vessel 1 to form a slurry of N:P atomic ratio 1.4 at a temperature of about 120°-126° C (but not above 130° C) and a moisture content of 15% $H_2O$ by weight. The hot slurry, substantially equivalent to that produced in the reaction vessel was introduced into a slurry splitter box 2. 50% by volume of the MAP/DAP slurry via 7 was premixed with 86 kg/hour of wet-process phosphoric acid (the secondary acid feed) 4, containing 51% $P_2O_5$ from the same source to lower the N:P atomic ratio to 1, the latter step being carried out in a steam heated slurry/acid mixing unit 3 mounted near one end of a pin mixer 8. The remaining 50% by volume of MAP/DAP slurry was added direct via $7^{11}$ to the pin mixer at one or more points, A, $A^1$, $A^{11}$, for example at point A as shown in the drawing. The moisture disengagement unit, that is, the pin mixer 8, allowed moisture to be released from the product as it passed along the pin mixer. The production rate of MAP during the run was 319 kg/hour and the final product had an N:P atomic ratio of 1.05 and an average composition 10.4% N, 53.0% $P_2O_5$ (total), 7.86% $H_2O$.

The resulting MAP was examined and compared with a control sample prepared in the same way but omitting the step of mixing the secondary acid feed with part of the slurry stream; that is, all the acid and slurry were mixed at the same time. The process of the present invention had the effect of giving a more fluid slurry at N:P atomic ratio 1, and a greater proportion of large crystals. In addition, the product obtained by the process described in this Example was a mixture of finely divided, fluffy material and very soft granules, while the control sample was a hard, gritty product.

What we claim is:

1. A process for the production of a particulate solid product comprising ammonium phosphate of N:P atomic ratio 0.95 to 1.05 wherein a primary phosphoric acid-containing feed and ammonia are added to an aqueous slurry of ammonium phosphate of flowable consistency at the temperature of working and having an N:P atomic ratio of between 1.3 and 1.5 to form more slurry of substantially the same composition and concentration and flowable consistency, removing an amount of said slurry substantially equivalent to that produced by the addition of the phosphoric acid and ammonia and thereafter mixing the removed slurry with a secondary acid feed to reduce the N:P ratio to 0.95 to 1.05, wherein between 20% and 80% by volume of the removed slurry is mixed with the secondary acid feed, followed by the addition to the mixture of the remainder of the slurry, so that the ammonium phosphate of the resulting product has an N:P atomic ratio in the range 0.95 to 1.05, the water contents of the removed aqueous slurry and the secondary acid feed being such that the resulting product starts to solidify in a moisture disengagement unit where it is treated for a sufficient period of time for said product to be solid at ambient temperature whereby extra milling of the product is avoided.

2. A process as claimed in claim 1, wherein the primary acid feed is wet-process phosphoric acid.

3. A process as claimed in claim 1, wherein the secondary acid feed is a mineral acid selected from the group consisting of phosphoric acid, nitric acid, sulphuric acid and mixtures thereof.

4. A process as claimed in claim 3, wherien the phosphoric acid is wet-process phosphoric acid.

5. A process as claimed in claim 1, wherein the secondary acid feed is partially ammoniated.

6. A process as claimed in claim 1, wherein a nitrogen compound, selected from the group consisting of ammonium salts, urea, and mixtures thereof, is added to the removed slurry during or following the addition of the secondary acid feed.

7. A process as claimed in claim 1, wherein a potassium compound is added to the removed slurry during or following the addition of the secondary acid feed.

8. A process as claimed in claim 1, wherein a part of the solid end-product is recycled to the process.

9. A process for producing a particulate solid product comprising ammonium phosphate of N:P atomic ratio in the range 0.95 to 1.05 is performed by mixing wet-process phosphoric acid of $P_2O_5$ content in the range 30% to 54% $P_2O_5$ and gaseous ammonia to form an aqueous slurry of ammonium phosphate, the N:P atomic ratio of the slurry being fixed in the range 1.3 to 1.5 and the moisture content of the slurry being fixed in the range 10% to 20%, in such proportions as to form more slurry of substantially the same composition, simultaneously removing from the slurry an amount substantially eqivalent to that produced from the phosphoric acid and ammonia, and mixing 20% to 80% by volume of the removed amount of slurry with further wet-process phosphoric acid, thereafter adding the remainder of the slurry, whereby the product so formed solidifies and is of the desired N:P atomic ratio, the moisture disengagement being carried out under such conditions that the moisture content of the product is so reduced by evaporation that the product is solid at ambient temperature whereby extra milling of the product is avoided.

* * * * *